(12) United States Patent
Bangalore et al.

(10) Patent No.: US 10,886,743 B2
(45) Date of Patent: Jan. 5, 2021

(54) PROVIDING ENERGY ELASTICITY SERVICES VIA DISTRIBUTED VIRTUAL BATTERIES

(71) Applicant: International Business Machines Corporation, Armonk, NY (US)

(72) Inventors: Ranjini Bangalore, Bangalore (IN); Prakash Murali, Princeton, NJ (US); Dilip Krishnaswamy, Bangalore (IN); Shivkumar Kalyanaraman, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 16/105,422

(22) Filed: Aug. 20, 2018

(65) Prior Publication Data

US 2020/0059097 A1  Feb. 20, 2020

(51) Int. Cl.
*H02J 3/32* (2006.01)
*H02J 3/38* (2006.01)
*G05B 19/042* (2006.01)

(52) U.S. Cl.
CPC .............. *H02J 3/32* (2013.01); *G05B 19/042* (2013.01); *H02J 3/382* (2013.01); *G05B 2219/2639* (2013.01)

(58) Field of Classification Search
CPC ...... H02J 3/32; H02J 3/38; H02J 3/382; H02J 3/381; G05B 19/042; G05B 2219/2639
See application file for complete search history.

(56) References Cited

U.S. PATENT DOCUMENTS 9,159,042 B2  10/2015 Steven et al.
9,342,375 B2   5/2016 Hyser et al.
(Continued)

FOREIGN PATENT DOCUMENTS

CN     103377084 A    10/2013

OTHER PUBLICATIONS

Toosi et al., Renewable-Aware Geographical Load Balancing of Web Applications for Sustainable Data Centers, Journal of Network and Computer Applications vol. 83, Apr. 1, 2017.
(Continued)

*Primary Examiner* — M. N. Von Buhr
(74) *Attorney, Agent, or Firm* — Ryan, Mason & Lewis, LLP

(57) ABSTRACT

Methods, systems, and computer program products for providing energy elasticity services via distributed virtual batteries are provided herein. A computer-implemented method includes grouping virtual energy storage resources from a distributed collection of virtual energy storage systems; partitioning the virtual energy storage resources of each virtual energy storage system into (i) a sub-set of the virtual energy storage resources allocated for participation in one or more local energy markets and (ii) a sub-set of the virtual energy storage resources allocated for participation in one or more geographically-distributed energy markets; scheduling, based at least in part on the grouping and the partitioning, an allocation of at least a portion of the virtual energy storage resources from the distributed collection of virtual energy storage systems to one or more geographically-distributed energy markets; and outputting the scheduled allocation to the distributed collection of multiple virtual energy storage systems.

16 Claims, 9 Drawing Sheets

(56) References Cited

U.S. PATENT DOCUMENTS

| | | | |
|---|---|---|---|
| 9,413,193 B2* | 8/2016 | Park | H02J 7/34 |
| 10,379,586 B2* | 8/2019 | Guruprasad | G06F 1/26 |
| 10,554,046 B2* | 2/2020 | de Hoog | H02J 13/0017 |
| 10,608,436 B2* | 3/2020 | de Hoog | H02J 13/00028 |
| 2002/0084655 A1* | 7/2002 | Lof | F03D 7/048 |
| | | | 290/44 |
| 2002/0103745 A1* | 8/2002 | Lof | H02J 3/383 |
| | | | 705/37 |
| 2011/0246259 A1* | 10/2011 | Hostyn | G06Q 50/06 |
| | | | 370/7.31 |
| 2012/0296482 A1* | 11/2012 | Steven | G05B 13/04 |
| | | | 700/291 |
| 2014/0039965 A1* | 2/2014 | Steven | G06Q 10/00 |
| | | | 705/7.25 |
| 2014/0330611 A1* | 11/2014 | Steven | G06Q 10/06314 |
| | | | 705/7.24 |
| 2014/0330695 A1* | 11/2014 | Steven | G06Q 50/06 |
| | | | 705/37 |
| 2015/0121113 A1* | 4/2015 | Ramamurthy | H02J 9/062 |
| | | | 713/340 |
| 2017/0005515 A1* | 1/2017 | Sanders | H02J 3/383 |
| 2017/0102726 A1* | 4/2017 | Goldsmith | H02J 13/00 |
| 2018/0024603 A1 | 1/2018 | Guruprasad et al. | |
| 2019/0190269 A1* | 6/2019 | de Hoog | H02J 3/383 |

OTHER PUBLICATIONS

Wang et al., Datacenters as Controllable Load Resources in the Electricity Market, Dec. 2013.

Shi et al., Leveraging energy storage to optimize data center electricity cost in emerging power markets, Jun. 2016.

Rao et al., Distributed Coordination of Internet Data Centers Under Multiregional Electricity Markets, Jan. 2012.

Guruprasad et al., Coupling a small battery with a datacenter for fast frequency regulation, 2017.

* cited by examiner

US 10,886,743 B2

PROVIDING ENERGY ELASTICITY SERVICES VIA DISTRIBUTED VIRTUAL BATTERIES

FIELD

The present application generally relates to information technology, and, more particularly, to energy management techniques.

BACKGROUND

Energy markets aim to balance supply and demand mismatches, and such markets typically employ a collection of flexible energy consumers. In some instances, for example, a grid operator can request energy market participants to vary energy consumption within a given temporal deadline. Additionally, energy markets can include diverse timescales for various load response deadlines, and revenue incentives can be based on the magnitude of energy variation and the ability to meet deadlines.

However, data centers implemented within such energy markets commonly incur significant capital and operating expenses. In existing energy management approaches, attempts to decrease capital and operating expenses include decreasing power consumption of data centers. Such power consumption decreases, however, involve various challenges and disadvantageous effects.

SUMMARY

In one embodiment of the invention, techniques for providing energy elasticity services via distributed virtual batteries are provided. An exemplary computer-implemented method can include grouping, into one or more groups, virtual energy storage resources from a distributed collection of multiple virtual energy storage systems, wherein each of the multiple virtual energy storage systems comprises (i) at least one computing resource, (ii) one or more energy storage components, and (iii) one or more renewable energy sources. Such a method can also include partitioning the virtual energy storage resources of each virtual energy storage system within the one or more groups into (i) a sub-set of the virtual energy storage resources allocated for participation in one or more energy markets local to the respective virtual energy storage system and (ii) a sub-set of the virtual energy storage resources allocated for participation in one or more energy markets distributed away from the respective virtual energy storage system. Additionally, such a method can include scheduling, based at least in part on the grouping and the partitioning, an allocation of at least a portion of the virtual energy storage resources from the distributed collection of multiple virtual energy storage systems to one or more geographically-distributed energy markets. Further, such a method can include outputting the scheduled allocation to the distributed collection of multiple virtual energy storage systems.

Also, an additional embodiment of the invention can include advertising the partitioned virtual energy storage resources of each virtual energy storage system to one or more centralized scheduling components, and scheduling, based at least in part on the partitioning advertising steps, an allocation of at least a portion of the virtual energy storage resources from the distributed collection of multiple virtual energy storage systems to one or more distributed energy markets.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
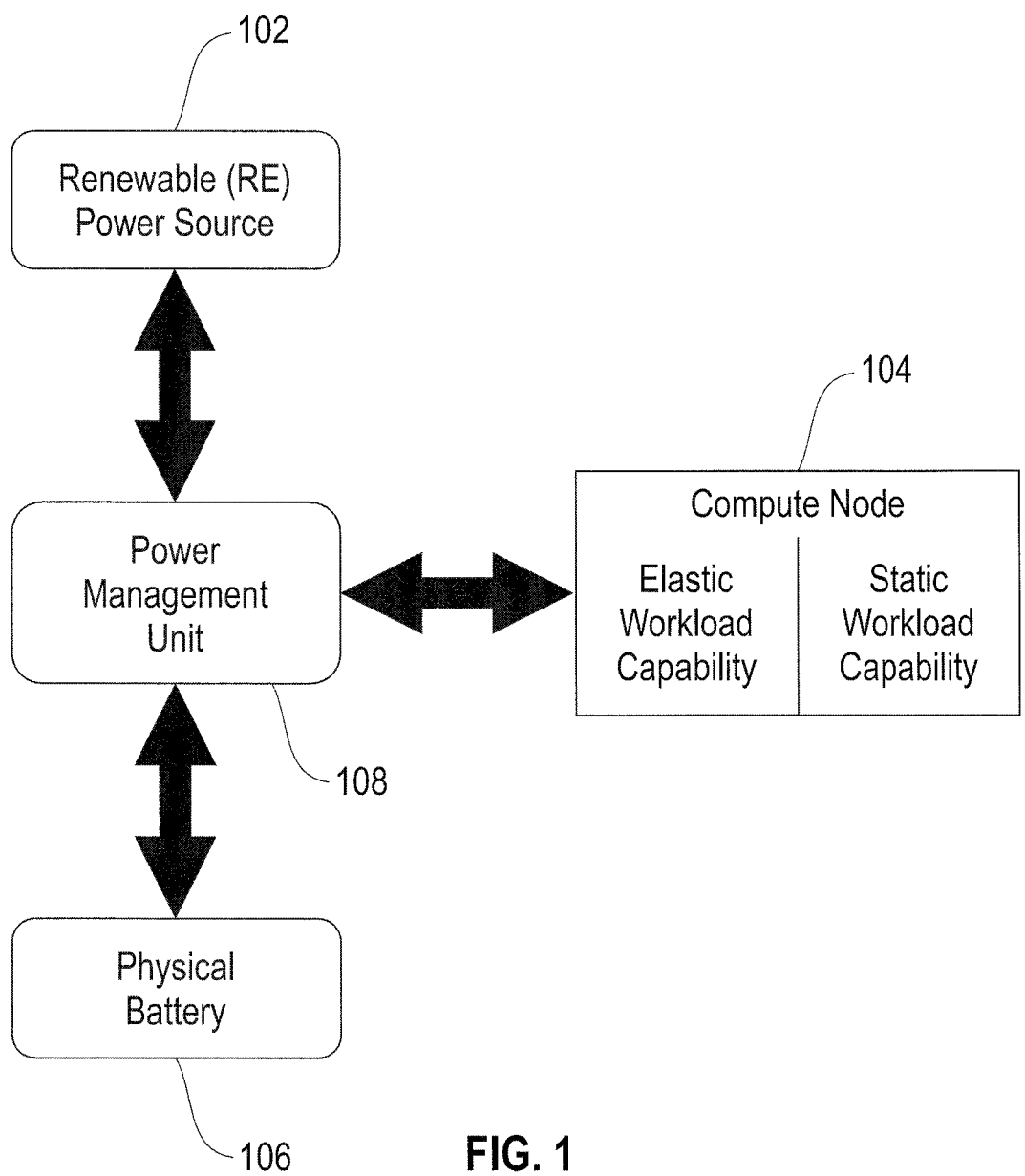
FIG. 1 is a diagram illustrating a virtual battery (VB), according to an exemplary embodiment of the invention.

As described herein, an embodiment of the present invention includes providing energy elasticity services via distributed virtual batteries. In one or more embodiments of the invention, a virtual battery (VB) can include a data center (DC) and an energy storage (ES). At least one embodiment of the invention includes utilizing a distributed collection of virtual batteries for optimizing renewable energy utilization and energy market participation. Such an embodiment can include clustering VB resources based on response time to serve energy elasticity (that is, the ability to provide energy or absorb energy on demand or in response to a pre-determined schedule) services on different time scales, and partitioning compute and energy elasticity capability of each VB within a cluster, to locally and/or geographically distributed energy markets. Further, such an embodiment can include utilizing renewable power, battery capacity and compute capacity to service loads that are shared by VBs in a cluster to maintain a level of quality of service (QoS).

As further detailed herein, one or more embodiments of the invention includes implementing a system of networked VBs. In such an embodiment, each VB is an integrated system of energy assets, which can include a flexible computing resource such as a data center, one or more energy storage components such as batteries, and one or more renewable energy sources. Such an integrated system of energy assets can modulate compute workloads, energy storage and renewable energy generation depending on one or more signals from one or more energy elasticity markets.

Additionally, at least one embodiment of the invention includes implementing a methodology in which each VB in a cluster of VBs continuously evaluates and determines its energy elasticity capabilities of the energy assets associated with a corresponding data center site at multiple time scales. Subsequently, each VB can partition the energy elasticity capability to participate in one or more local markets as well as in one or more non-local markets using additional available energy elasticity capabilities. Each VB additionally advertises the energy elasticity capabilities of the energy assets associated with its corresponding data center site at multiple time scales for local as well as non-local (geographically distributed) markets to one or more centralized, hierarchical and/or distributed schedulers.

Accordingly, one or more embodiments of the invention include determining multiple tuples of energy elasticity versus time for local and non-local markets: (Local$\Delta$E1, Local$\Delta$T1, Non-Local$\Delta$E1, Non-Local$\Delta$T1), (Local$\Delta$E2, Local$\Delta$T2, Non-Local$\Delta$E2, Non-Local$\Delta$T2), . . . , (Local$\Delta$En, Local$\Delta$Tn, Non-Local$\Delta$En, Non-Local$\Delta$Tn). Also, in such an embodiment, VBs can continuously re-evaluate, re-partition and re-advertise such tuples. A scheduler component, using information pertaining to the energy elasticity capabilities of different VBs at multiple time scales, can partition the VBs depending on the multiple time scales for participation in one or more local and/or non-local energy elasticity markets. Subsequently, the scheduler component can distribute a workload across multiple virtual batteries in a manner that the virtual batteries can cooperate with each other to supplement the energy elasticity capabilities required for responding to the different local and/or non-local energy markets at multiple time scales. Note that, in one or more embodiments of the invention, determining the energy elasticity capabilities of VBs can include determining the energy elasticity capabilities of one or more co-located renewable energy sources and extending the available capabilities to geographically-distributed VBs, thereby indirectly participating in geographically-distributed energy elasticity markets.

As further detailed herein, one or more embodiments of the invention include multi-objective optimization of partitioning energy elasticity capabilities at multiple time scales at each of multiple VBs, clustering the VBs based at least in part on the multiple time scales, and scheduling one or more workloads across the multiple VBs to maximize the revenue generated from participation in local and non-local energy elasticity markets. Such scheduling can also be carried out such that quality of service requirements are maintained for all users utilizing the corresponding data centers for job execution.

Such cooperation among VBs can lead to a number of advantages over existing energy management approaches. For example, such advantages can include each VB participating in geographically-distributed energy elasticity markets, as well as each VB utilizing the assistance of other VBs to potentially make a higher bid than its local resources would otherwise allow, thereby, potentially earning additional revenue. Additionally, such advantages can also include the VBs adjusting their bidding capability according to the resources available from other VBs, and maintaining quality of service levels for the participating data centers.

Accordingly, at least one embodiment of the invention includes implementing proactive methodology which enables the visibility of energy elasticity capabilities to multiple geographically-distributed entities that can leverage such information. Such leveraging can include, for example, identifying and/or interacting with energy markets and/or alternative energy producers (renewable energy producers, etc.) that may have interest in the ability of one or more clusters of VBs to absorb excess energy, as well as identifying and/or interacting with energy consumers (such as an electric vehicle charging station, for instance) that may have interest in capturing energy from a corresponding data center over a limited time window.

FIG. 1 is a diagram illustrating a virtual battery, according to an exemplary embodiment of the invention. By way of illustration, FIG. 1 depicts components of a virtual battery, which include a renewable (RE) power source 102, a compute node 104, and a physical battery (energy storage) 106. As depicted in FIG. 1, the compute node 104 (which can include, for example, a data center) includes elastic workload capability and static workload capability. As used herein, elastic workloads include workloads which are characterized by one or more of the following: (a) a deadline for completion that is greater than the time required for execution (in other words, there is elasticity in terms of when the workload execution can be completed, and hence can be deferred to a later time without compromising on the quality of service); (b) can be executed at computing nodes which are distant from the location where the workload was initiated; and (c) can be executed in parts, thereby allowing configuration of compute resources allocated to execute the workload. As used herein, static workloads includes workloads that do not have elasticity in terms of time of completion, location of execution, and/or configurability of compute resources assigned.

Additionally, as illustrated in FIG. 1, the RE power source 102 provides energy to both the compute node 104 and the physical battery 106, while the compute node 104 and the physical battery 106 interact with each other. Depending on the workloads queued, the associated elasticities and energy consumption, local and non-local market demands and prices, and time scale of response, a scheduler component can determine the energy consumption. Based on the energy consumption schedule, which in turn, is optimized based on one or more of the above-noted factors, the RE power source 102 output can be divided between charging the compute node 104 and physical battery 106. Similarly, the compute node 104 can either absorb energy from the physical battery 106 or reduce its workload and energy consumption to charge the physical battery 106, which in turn can be used to provide energy to the markets or store for a later use. Note that the interaction between the compute node 104, physical battery 106, and the RE power source 102 is regulated by power management unit 108. In one or more embodiments of the invention, the power management unit 108 can convey to the RE source 102 how energy is required by the compute node 104 and/or the physical battery 106.

In connection with FIG. 1, and as described herein, VBs (such as the VB depicted in FIG. 1) can be clustered based on response time to serve energy elasticity services on different time scales. Within each cluster, one or more embodiments of the invention can include (i) partitioning the compute and energy elasticity capabilities of each VB to either local energy markets or geographically-distributed energy markets and (ii) advertising such capabilities accordingly. As the VB conveys how much energy it can absorb or discharge and at what time scale to the local energy market, scheduler and/or a peer VB, in a proactive manner without waiting for the energy market, scheduler and/or peer VB to request such information, such an information broadcast is referred to herein as an advertisement. Note that the energy market, scheduler and/or peer VB can also request such information, and the VB can provide the information in response to such requests.

For example, energy elasticity at different scales and local energy market information (such as, for example, how much energy the VB has committed to the local energy market and the incentive that the VB receives for the same) conveyed to the scheduler enables the scheduler to assimilate all such advertisements and derive an optimal energy consumption and energy market consumption schedule. Such information allows the scheduler to assess which geographical energy market will be profitable, and the scheduler can accordingly allocate and route workloads to such markets, thereby allowing the VBs participating in the profitable markets to maximize their bids and advertise the maximized bids in the profitable markets.

Further, at least one embodiment of the invention can include leveraging distributed energy sharing across VBs to avoid and/or limit depleting the stored energy in a local battery (such as battery 106 in FIG. 1) to extend the lifespan of each VB. Also, such an embodiment can additionally include implementing load-shedding to maintain and/or enhance QoS. Such an embodiment includes utilizing the renewable power from RE power source 102, battery capacity (via physical batter 106) and compute capacity (via compute node 104) to service one or more loads that are shed by VBs in the cluster to maintain a QoS while responding to market demands.

Figure 2:
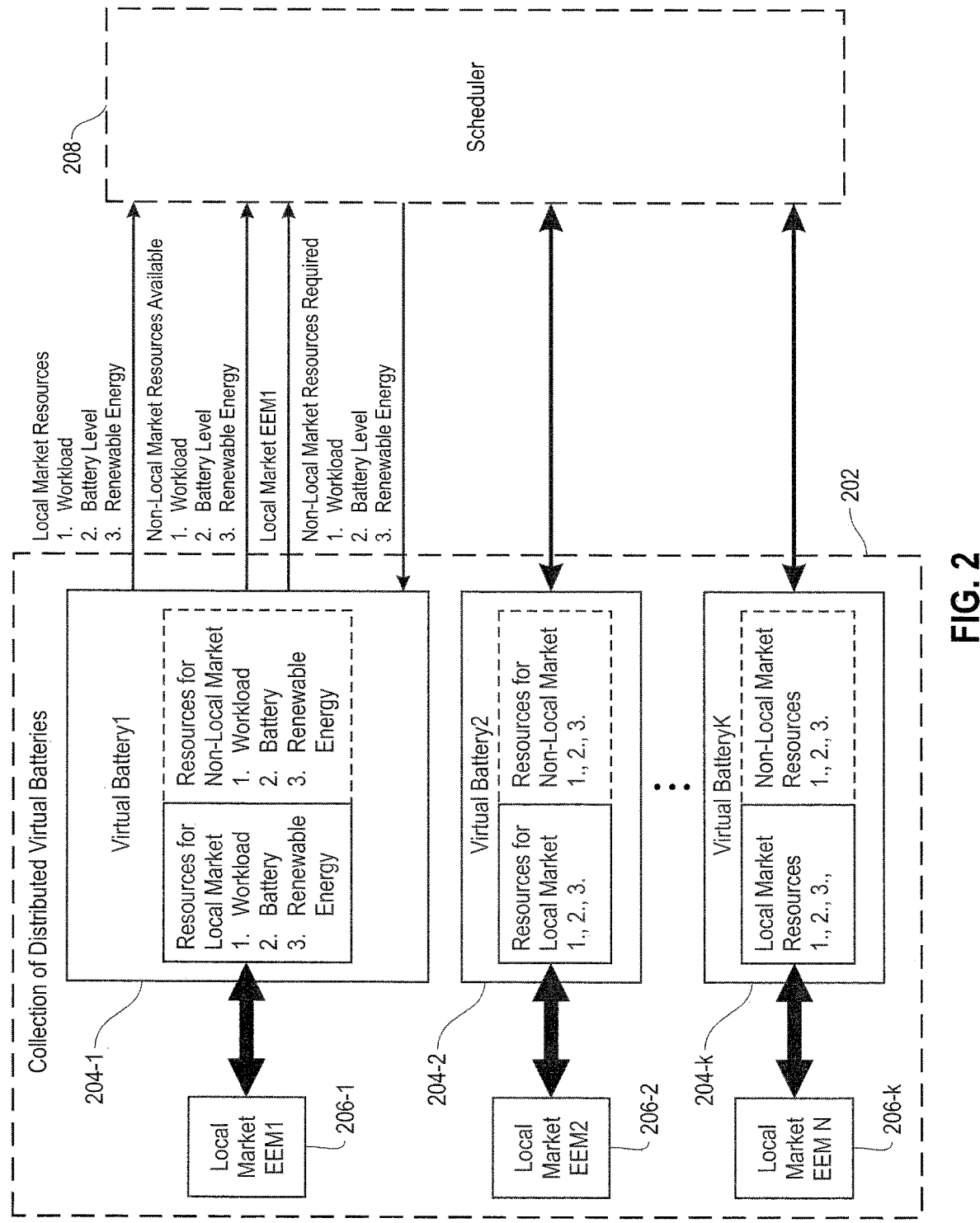
FIG. 2 is a diagram illustrating system architecture, according to an exemplary embodiment of the invention.

FIG. 2 is a diagram illustrating system architecture, according to an exemplary embodiment of the invention. By way of illustration, FIG. 2 depicts a collection 202 of distributed virtual batteries 204-1, 204-2 and 204-k (hereinafter collectively referred to as virtual batteries 204), wherein each of the virtual batteries 204 is linked to a respective local energy elasticity market (EEM): EEM 206-1, EEM 206-2 and EEM 206-k (hereinafter collectively referred to as EEMs 206). Additionally, as illustrated in FIG. 2, the virtual batteries 204 include resources (including—similar to the components depicted in FIG. 1—a workload/compute node, a battery, and a renewable energy source) for local energy markets and non-local (geographically-distributed) energy markets.

As also depicted in FIG. 2, a scheduler component 208 interacts with the virtual batteries 204. Specifically, as illustrated in the FIG. 2 example, the virtual batteries 204 can provide the scheduler 208 with the local and non-local energy market resources available from each of the virtual batteries 204, as well as information (such as identifying information, for example) pertaining to the corresponding EEMs 206.

Figure 3:
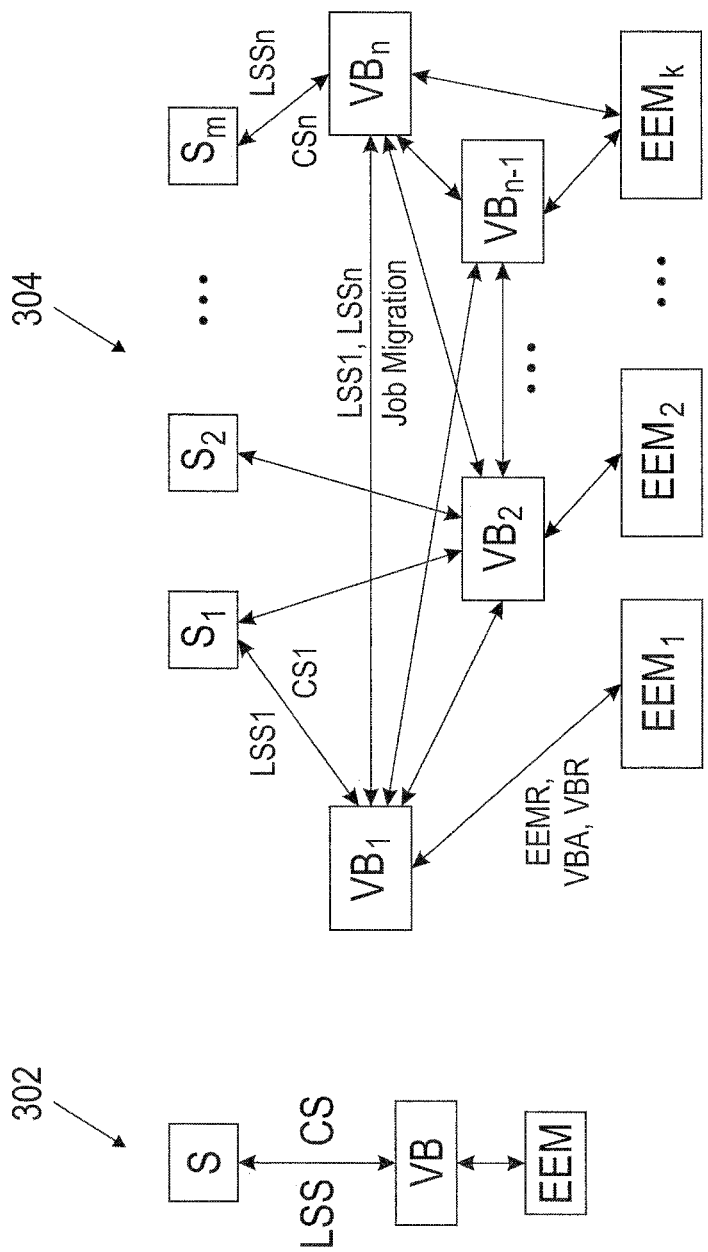
FIG. 3 is a diagram illustrating a single VB data flow in contrast with a data flow involving a distributed collection of multiple VBs, according to an exemplary embodiment of the invention.

FIG. 3 is a diagram illustrating a single VB data flow 302 in contrast with a data flow 304 involving a distributed collection of multiple VBs, according to an exemplary embodiment of the invention. By way of illustration, data flow 302 and data flow 304 depict VBs, schedulers (S), EEMs, EEM signals, EEM response constraints, local system states (LSS), numbers of free processors, current workload statistics, control signals (CS), energy elasticity market requests (EEMR), VB advertisements (VBA), and VB responses (VBR).

As seen in data flow 302, there is data flow between a VB, a scheduler, and a local energy market. The data flow between the scheduler and the VB comprises local system and control signals. The local state signals (LSS) include information about the number of processors in the VB, the number of free processors, current workload statistics and energy consumption profile. The control signals (CS) include the signals which indicate when and which workloads to defer and to schedule. Also, there is the interaction between the EEM and the VB regarding the advertisement of the VB about its energy elasticity capabilities at different time scales, commitment of the VB to the energy market, and the energy movement signals (indicating the amount of energy that is to be absorbed or discharged by the VB) from the energy market. Moving from a single VB to a network of VBs illustrated in data flow 304, the above description of signals remains applicable, and the sub-script in the signal names indicates the VB with which it is associated. Additionally, data flow 304 also shows that there is job migration between the VBs to achieve the cooperative participation in local and non-local markets.

As further detailed herein (for example, in FIG. 4), one or more embodiments of the invention can include utilizing one or more of the following variables:

$x_{i,j}(k)$ represents the amount of resources provided by node i to node j for services at time scale k;

$N_i^{Total}(k)$ represents the total amount of resources at node i for services at time scale k;

$N_i^{Local}(k)$ represents the amount of resources allocated by node i for its local tasks at time k;

$N_i^{Req}(k)$ represents the amount of resources requested by node i to the central scheduler at time k;

$N_i^{Avail}(k)$ represents the amount of resources that node i can make available to other nodes at time k;

the revenue at node i is $r_i(k)$ and the total revenue in the system at time k are represented by $R(k)$;

$\gamma_i(k)$ represents revenue per unit resource allocated; and $\rho_{i,j}$ represents the fraction of resource $x_{j,i}(k)$ from node j that is actually utilized at node i.

Also, one or more embodiments of the invention can include utilizing one or more of the following equations:

Resource constraint at node i: $N_i^{Local}(k) + \Sigma_j x_{i,j}(k) \leq N_i^{Total}(k)$;

Resource allocation by other node j to node i: $\Sigma_j x_{i,j}(k) = N_i^{Req}(k) + \eta_i(k)$, wherein the slack variable $\eta_i(k) \geq 0$;

Resource distribution from node i to other node j: $\Sigma_j x_{i,j}(k) + \beta_i(k) = N_i^{Avail}(k)$, wherein the slack variable $\beta_i(k) \geq 0$;

Revenue at node i: $r_i(k) = \gamma_i(k)(N_i^{Local}(k) + \Sigma_j \rho_{i,j} x_{i,j}(k))$; and Total revenue in the system: $R = \Sigma_{i,k} r_i(k)$.

Further, one or more embodiments of the invention can include implementing and executing an optimization problem as follows:

$$\max \sum_{i,k} r_i(k)$$

-continued $$N_i^{Local}(k) + \sum_j x_{i,j}(k) \leq N_i^{Total}(k), \forall\, i, k$$

$$\sum_k N_i^{Total}(k) \leq N_i^{Total}, \forall\, i$$

$$\sum_j x_{i,j}(k) = N_i^{Req}(k) + \eta_i(k), \eta_i \geq 0, \forall\, i, k$$

$$\sum_j x_{i,j}(k) + \beta_i(k) = N_i^{Avail}(k), \forall\, i, k$$

Figure 4:
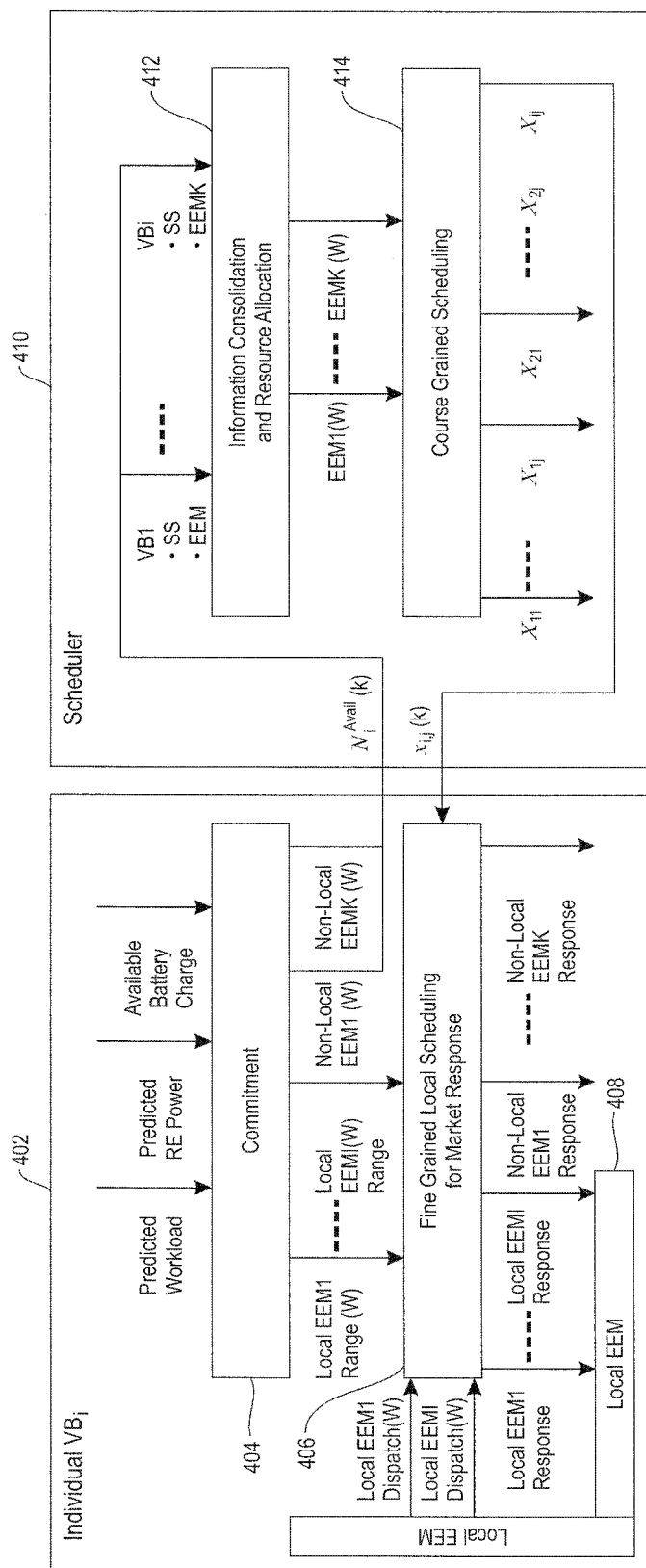
FIG. 4 is a diagram illustrating a data flow at an individual virtual battery and a data flow at a central scheduler, according to an exemplary embodiment of the invention.

FIG. 4 is a diagram illustrating a data flow 402 at an individual virtual battery and a data flow 410 at a central scheduler (which can be distributed or hierarchical), according to an exemplary embodiment of the invention. By way of illustration, the individual VB data flow includes a commitment component 404, a fine-grained local scheduling component 406 for market response, and local EEM components 408. The commitment component 404 determines the magnitude of energy movement (range [W]) and response time scale that can be committed to the local EEM and non-local EEM. The commitment so determined is based on predicted workload, available RE power and battery charge. The energy market sends the energy market dispatch signals that indicate the direction and magnitude of energy movement. Depending on the commitment and EEM dispatch signals, the VB absorbs or discharges energy denoted as a local EEM response and a non-local EEM response 408.

Data flow 410 shows the data flow between the VBs and the scheduler with local/non-local EEM responses from VBs and states of VBs as inputs. As shown via information consolidation and resource allocation component 412, the above-described information from the VBs is consolidated and resource allocation is performed by allocating and routing the workload across geographically distributed VBs. The resource allocation and routing output is an EEM range, which is taken by the scheduler to perform coarse-grained scheduling as shown in component 414. The output of the coarse-grained scheduling is the vector $[x_{11}[k], \ldots, x_{1j}[k], x_{21}[k], \ldots, x_{2j}[k], \ldots, x_{ij}[k]]$, which provides the amount of resources of VB 'i' assigned to resource 'j' at time scale 'k.'

Figure 5:
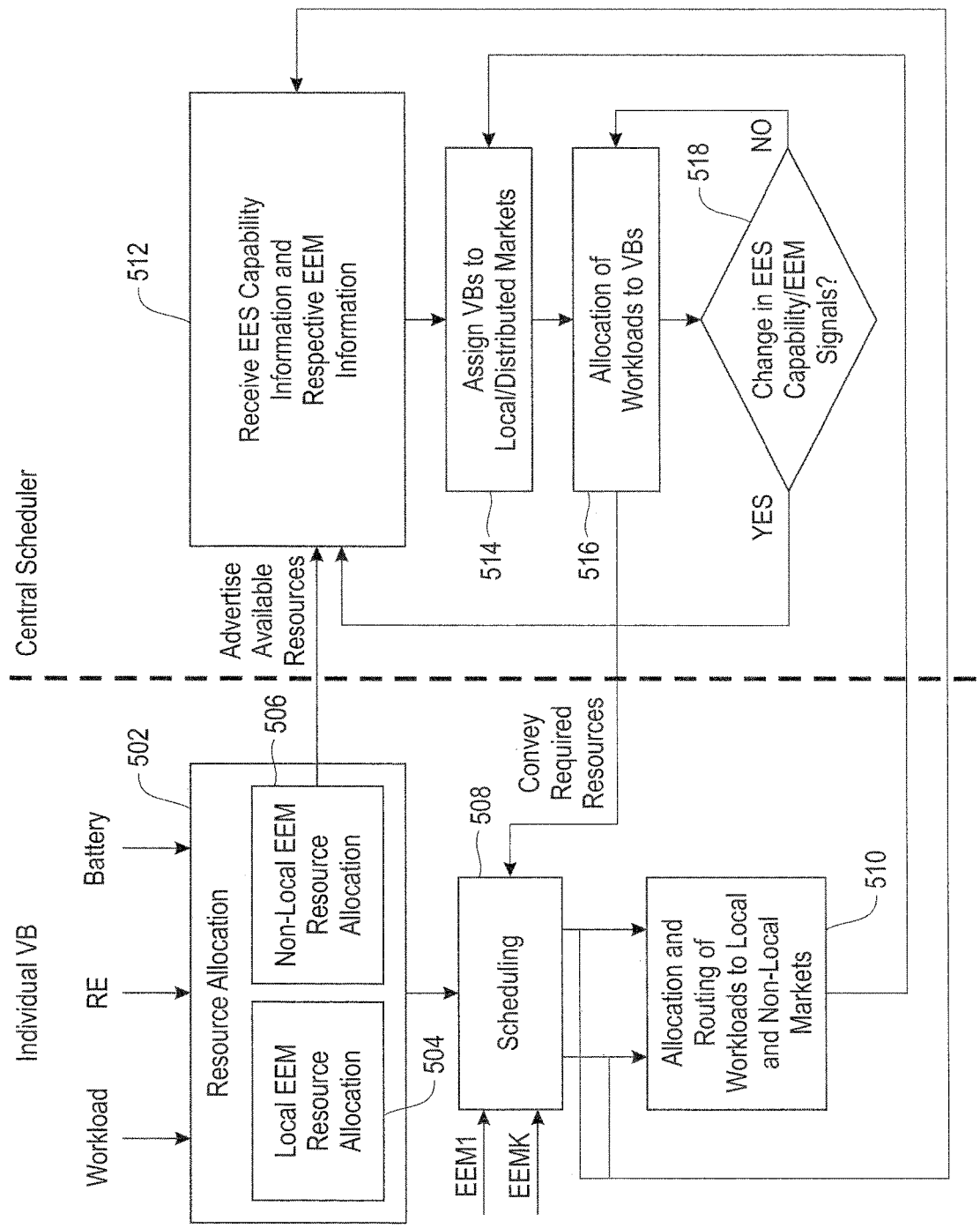
FIG. 5 is a diagram illustrating data flows at individual virtual batteries and a central scheduler, according to an exemplary embodiment of the invention.

FIG. 5 is a diagram illustrating data flows at individual virtual batteries and schedulers and a central scheduler (which can be distributed or hierarchical), according to an exemplary embodiment of the invention. By way of illustration, FIG. 5 depicts, in connection with an individual VB, a resource allocation component 502, which receives, as input, workload information, renewable energy input, and battery charge level information. The resource allocation component 502 includes a local EEM resource allocation component 504 and a non-local EEM resource allocation component 506, which process the above-noted inputs and provide local and non-local energy elasticity allocations, in terms of range of energy movement possible and the time scale of response, to a scheduling component 508. The scheduling component 508 receives additional EEM inputs as well as information pertaining to allocation of VB resources to local and non-local markets and inputs from the central/hierarchical scheduler on requirement(s) of resources for the non-local VBs (detailed further below). The scheduling component 508 processes all such inputs and generates a response 510, which indicates the allocation and routing of workloads to local and non-local energy markets. This output is provided to the central scheduler which will use such individual VB outputs to consolidate and perform workload routing at the central/hierarchical level.

Note that input from the local scheduler to the central scheduler is in addition to the advertised inputs from the individual VBs regarding their energy elasticity capabilities. The difference between the advertised capabilities information and resource allocation and routing information from the local scheduler is that the advertised information is an indication of the possible availability of resources, whereas the output of the local scheduler is an indication of energy elasticity resources that have been actually routed to local and non-local energy markets, taking into account the requirement of the local energy markets and input from central scheduler regarding the requirement for non-local energy markets.

As also depicted in FIG. 5, a central scheduler can, in step 512, receive EES capability information and respective EEM information from the resource allocation component 502. Additionally, in step 514, the central scheduler can assign VBs to one or more local and/or one or more non-local (distributed) markets, and in step 516, the central scheduler can allocate one or more workloads to the assigned VBs. Additionally, in step 518, the central scheduler can determine whether there is a change in EES capability and/or EEM signals subsequent to the allocation of workloads in step 516. If no (that is, no change determined), then the central scheduler returns to step 516. If yes (that is, there is a change determined), then the central scheduler returns to step 512. The system is a proactive system, as the individual VBs evaluate and advertise their capabilities. Further, there can be a feedback loop between the local and central scheduler, which enables local and central resource allocation of a network of VBs and workload routing to maximize bids and response to local and non-local energy elasticity markets.

Figure 6:
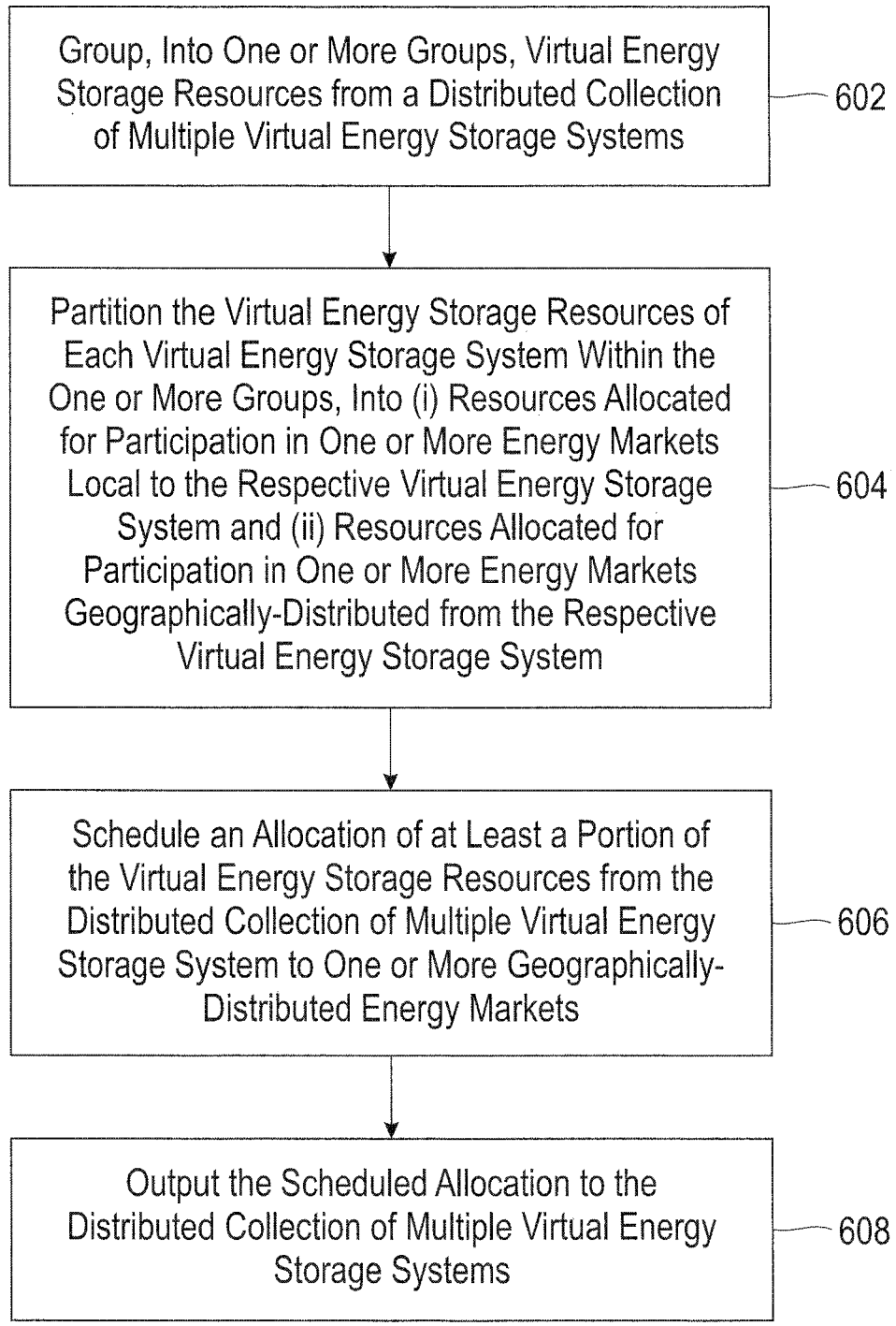
FIG. 6 is a flow diagram illustrating techniques according to an embodiment of the invention.

FIG. 6 is a flow diagram illustrating techniques according to an embodiment of the present invention. Step 602 includes grouping, into one or more groups, virtual energy storage resources from a distributed collection of multiple virtual energy storage systems, wherein each of the multiple virtual energy storage systems comprises (i) at least one computing resource, (ii) one or more energy storage components, and (iii) one or more renewable energy sources. The at least one computer resource can include, for example, a data center, and the energy storage components can include one or more batteries. Also, the virtual energy storage resources can include energy elasticity capabilities attributed to the distributed collection of multiple virtual energy storage systems.

Also, in at least one embodiment of the invention, grouping can include grouping the virtual energy storage resources based at least in part on response time to serve one or more energy elasticity services on different time scales.

Step 604 includes partitioning the virtual energy storage resources of each virtual energy storage system within the one or more groups into (i) a sub-set of the virtual energy storage resources allocated for participation in one or more energy markets local to the respective virtual energy storage system and (ii) a sub-set of the virtual energy storage resources allocated for participation in one or more energy markets distributed away from the respective virtual energy storage system.

Step 606 includes scheduling, based at least in part on the grouping and the partitioning, an allocation of at least a portion of the virtual energy storage resources from the distributed collection of multiple virtual energy storage systems to one or more geographically-distributed energy markets. In at least one embodiment of the invention, the scheduling is in response to one or more energy modulation request signals from one or more remote devices. In such an embodiment, the energy modulation request signals correspond to multiple requests for energy elasticity services at different time scales, and the one or more remote devices can represent one or more utility entities.

Additionally, in one or more embodiments of the invention, the scheduling is based at least in part on maximizing revenue in connection with the one or more geographically-distributed energy markets and/or based at least in part on reducing service level agreement losses in connection with the one or more geographically-distributed energy markets. Further, in at least one embodiment of the invention, the scheduling is based at least in part on the types of users being served by the one or more geographically-distributed energy markets.

Step 608 includes outputting the scheduled allocation to the distributed collection of multiple virtual energy storage systems.

The techniques depicted in FIG. 6 can also include evaluating, per a pre-determined temporal interval, energy elasticity capabilities of the virtual energy storage resources at multiple time scales within each of the multiple virtual energy storage systems. Additionally, one or more embodiments of the invention include advertising the partitioned virtual energy storage resources of each virtual energy storage system within the one or more groups to one or more centralized scheduling components.

The techniques depicted in FIG. 6 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 7:
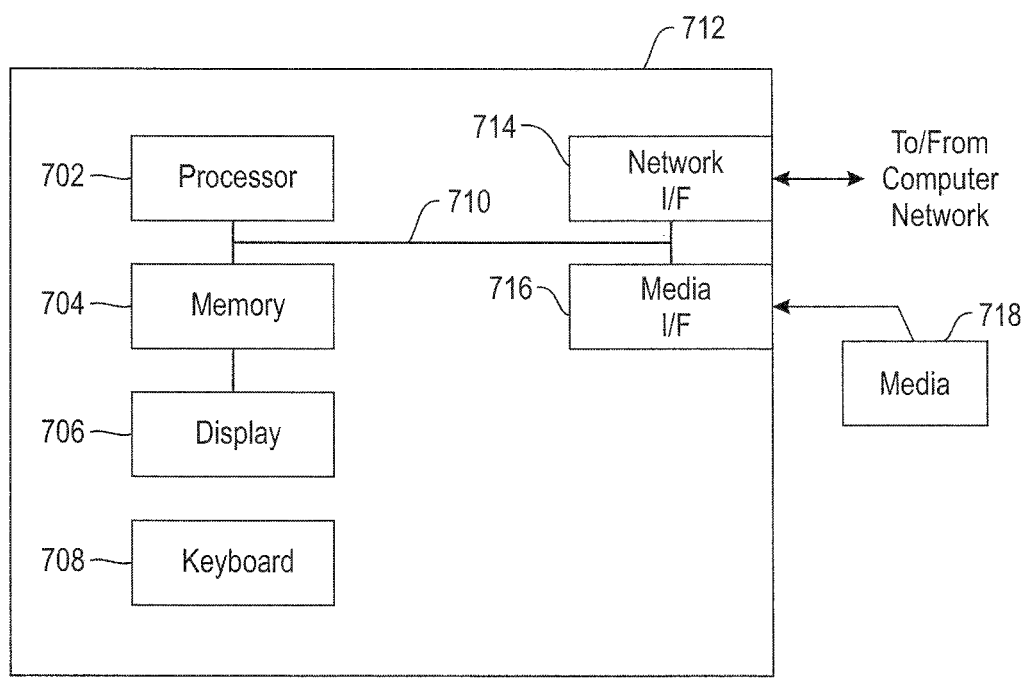
FIG. 7 is a system diagram of an exemplary computer system on which at least one embodiment of the invention can be implemented.

Additionally, an embodiment of the present invention can make use of software running on a computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 702. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
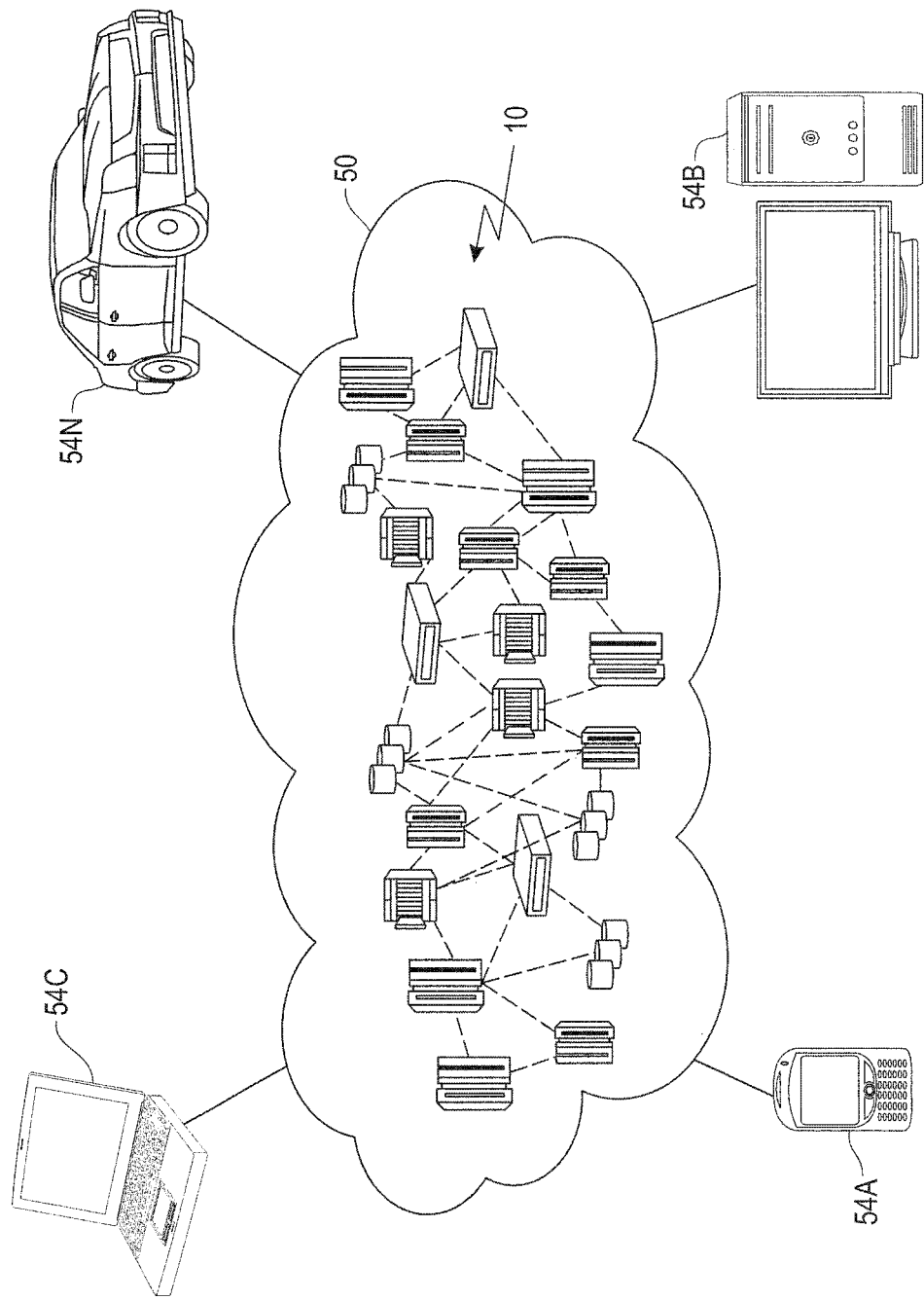
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
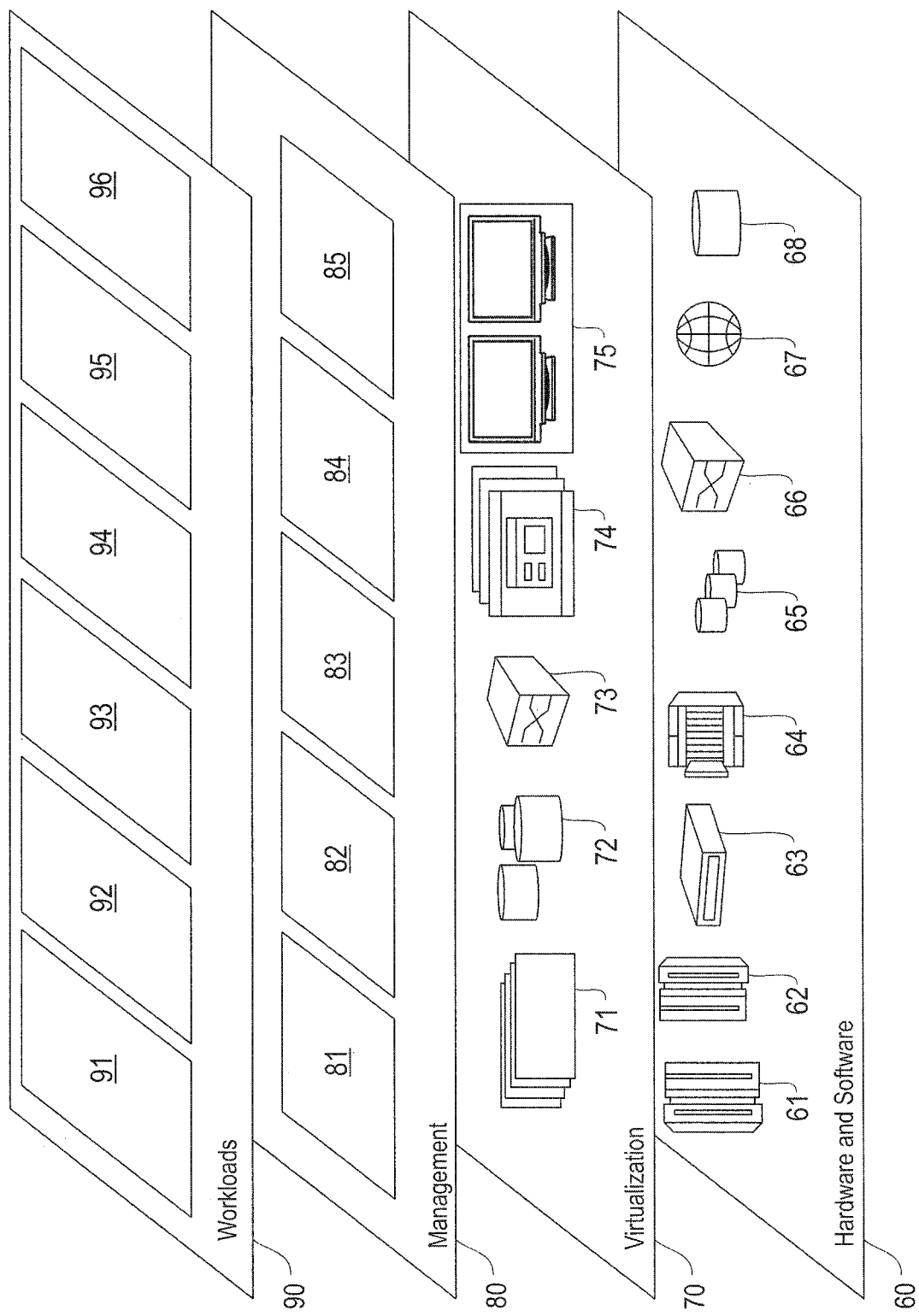
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and energy elasticity services implementation 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, clustering VB resources based on response time to serve energy elasticity services on different time scales and partitioning compute and energy elasticity capability of each VB within the cluster, to either locally or geographically distributed energy markets.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
    grouping, into two or more groups, virtual energy storage resources from a distributed collection of multiple virtual energy storage systems, wherein the virtual energy storage resources comprise (i) at least one computing resource, (ii) one or more energy storage components, and (iii) one or more renewable energy sources, wherein said grouping comprises grouping the virtual energy storage resources based at least in part on response time to serve one or more energy elasticity services on different time scales;
    partitioning the virtual energy storage resources of each virtual energy storage system within the two or more groups into (i) a sub-set of the virtual energy storage resources allocated for participation in one or more energy markets, from a set of geographically-distributed energy markets, local to the respective virtual energy storage system and (ii) a sub-set of the virtual energy storage resources allocated for participation in one or more energy markets, from the set of geographically-distributed energy markets, distributed away from the respective virtual energy storage system;
    scheduling, based at least in part on said grouping and said partitioning, an allocation of at least a portion of the virtual energy storage resources from the distributed collection of multiple virtual energy storage systems to one or more of the geographically-distributed energy markets; and
    outputting the scheduled allocation to the distributed collection of multiple virtual energy storage systems;
    wherein the method is carried out by at least one computing device.

2. The computer-implemented method of claim 1, wherein the at least one computer resource comprises a data center.

3. The computer-implemented method of claim 1, wherein the one or more energy storage components comprises one or more batteries.

4. The computer-implemented method of claim 1, wherein the virtual energy storage resources comprise energy elasticity capabilities attributed to the distributed collection of multiple virtual energy storage systems.

5. The computer-implemented method of claim 1, wherein said scheduling is in response to one or more energy modulation request signals from one or more remote devices.

6. The computer-implemented method of claim 5, wherein the energy modulation request signals correspond to multiple requests for energy elasticity services at different time scales.

7. The computer-implemented method of claim 5, wherein the one or more remote devices represent one or more utility entities.

8. The computer-implemented method of claim 1, wherein said scheduling is based at least in part on types of users being served by the one or more geographically-distributed energy markets.

9. The computer-implemented method of claim 1, comprising:
   evaluating, per a pre-determined temporal interval, energy elasticity capabilities of the virtual energy storage resources at multiple time scales within each of the multiple virtual energy storage systems.

10. The computer-implemented method of claim 1, comprising:
    advertising the partitioned virtual energy storage resources of each virtual energy storage system within the two or more groups to one or more centralized scheduling systems.

11. A computer program product comprising a computer readable storage medium having program instructions embodied therewith, the program instructions executable by a computing device to cause the computing device to:
    group, into two or more groups, virtual energy storage resources from a distributed collection of multiple virtual energy storage systems, wherein the virtual energy storage resources comprise (i) at least one computing resource, (ii) one or more energy storage components, and (iii) one or more renewable energy sources, wherein said grouping comprises grouping the virtual energy storage resources based at least in part on response time to serve one or more energy elasticity services on different time scales;
    partition the virtual energy storage resources of each virtual energy storage system within the two or more groups into (i) a sub-set of the virtual energy storage resources allocated for participation in one or more energy markets, from a set of geographically-distributed energy markets, local to the respective virtual energy storage system and (ii) a sub-set of the virtual energy storage resources allocated for participation in one or more energy markets, from the set of geographically-distributed energy markets, distributed away from the respective virtual energy storage system;
    schedule, based at least in part on said grouping and said partitioning, an allocation of at least a portion of the virtual energy storage resources from the distributed collection of multiple virtual energy storage systems to one or more of the geographically-distributed energy markets; and
    output the scheduled allocation to the distributed collection of multiple virtual energy storage systems.

12. The computer program product of claim 11, wherein the at least one computer resource comprises a data center.

13. The computer program product of claim 11, wherein the one or more energy storage components comprises one or more batteries.

14. The computer program product of claim 11, wherein the virtual energy storage resources comprise energy elasticity capabilities attributed to the distributed collection of multiple virtual energy storage systems.

15. A system comprising:
    a memory; and
    at least one processor operably coupled to the memory and configured for:
       grouping, into two or more groups, virtual energy storage resources from a distributed collection of multiple virtual energy storage systems, wherein the virtual energy storage resources comprise (i) at least one computing resource, (ii) one or more energy storage components, and (iii) one or more renewable energy sources, wherein said grouping comprises grouping the virtual energy storage resources based at least in part on response time to serve one or more energy elasticity services on different time scales;
       partitioning the virtual energy storage resources of each virtual energy storage system within the two or more groups into (i) a sub-set of the virtual energy storage resources allocated for participation in one or more energy markets, from a set of geographically-distributed energy markets, local to the respective virtual energy storage system and (ii) a sub-set of the virtual energy storage resources allocated for participation in one or more energy markets, from the set of geographically-distributed energy markets, distributed away from the respective virtual energy storage system;
       scheduling, based at least in part on said grouping and said partitioning, an allocation of at least a portion of the virtual energy storage resources from the distributed collection of multiple virtual energy storage systems to one or more of the geographically-distributed energy markets; and
       outputting the scheduled allocation to the distributed collection of multiple virtual energy storage systems.

16. A computer-implemented method, the method comprising:
    grouping, into multiple groups, virtual energy storage resources from a distributed collection of virtual energy storage systems, wherein the virtual energy storage resources comprise (i) at least one computing resource, (ii) one or more energy storage components, and (iii) one or more renewable energy sources, wherein said grouping comprises grouping the virtual energy storage resources based at least in part on response time to serve one or more energy elasticity services on different time scales;
    partitioning the virtual energy storage resources of each of the distributed collection of virtual energy storage systems within the multiple groups into (i) a sub-set of the virtual energy storage resources allocated for participation in one or more energy markets, from a set of geographically-distributed energy markets, local to the respective virtual energy storage system and (ii) a sub-set of the virtual energy storage resources allocated for participation in one or more energy markets, from the set of geographically-distributed energy markets, distributed away from the respective virtual energy storage system;
    advertising the partitioned virtual energy storage resources of each of the distributed collection of virtual energy storage systems to one or more centralized scheduling systems;
    scheduling, based at least in part on said partitioning and said advertising, an allocation of at least a portion of the virtual energy storage resources from the distributed collection of multiple virtual energy storage systems to one or more distributed energy markets; and
    outputting the scheduled allocation to the distributed collection of multiple virtual energy storage systems;
    wherein the method is carried out by at least one computing device.

* * * * *

UNITED STATES PATENT AND TRADEMARK OFFICE
CERTIFICATE OF CORRECTION

| | | |
|---|---|---|
| PATENT NO. | : 10,886,743 B2 | |
| APPLICATION NO. | : 16/105422 | |
| DATED | : January 5, 2021 | |
| INVENTOR(S) | : Ranjini Bangalore Guruprasad et al. | |

It is certified that error appears in the above-identified patent and that said Letters Patent is hereby corrected as shown below:

On the Title Page

Item (12) should read Guruprasad et al.

Item (72) in the "Inventors" section, please replace "Ranjini Bangalore" with -- Ranjini Bangalore Guruprasad --.

Signed and Sealed this
Thirty-first Day of May, 2022

Katherine Kelly Vidal
*Director of the United States Patent and Trademark Office*